Patented Sept. 15, 1936

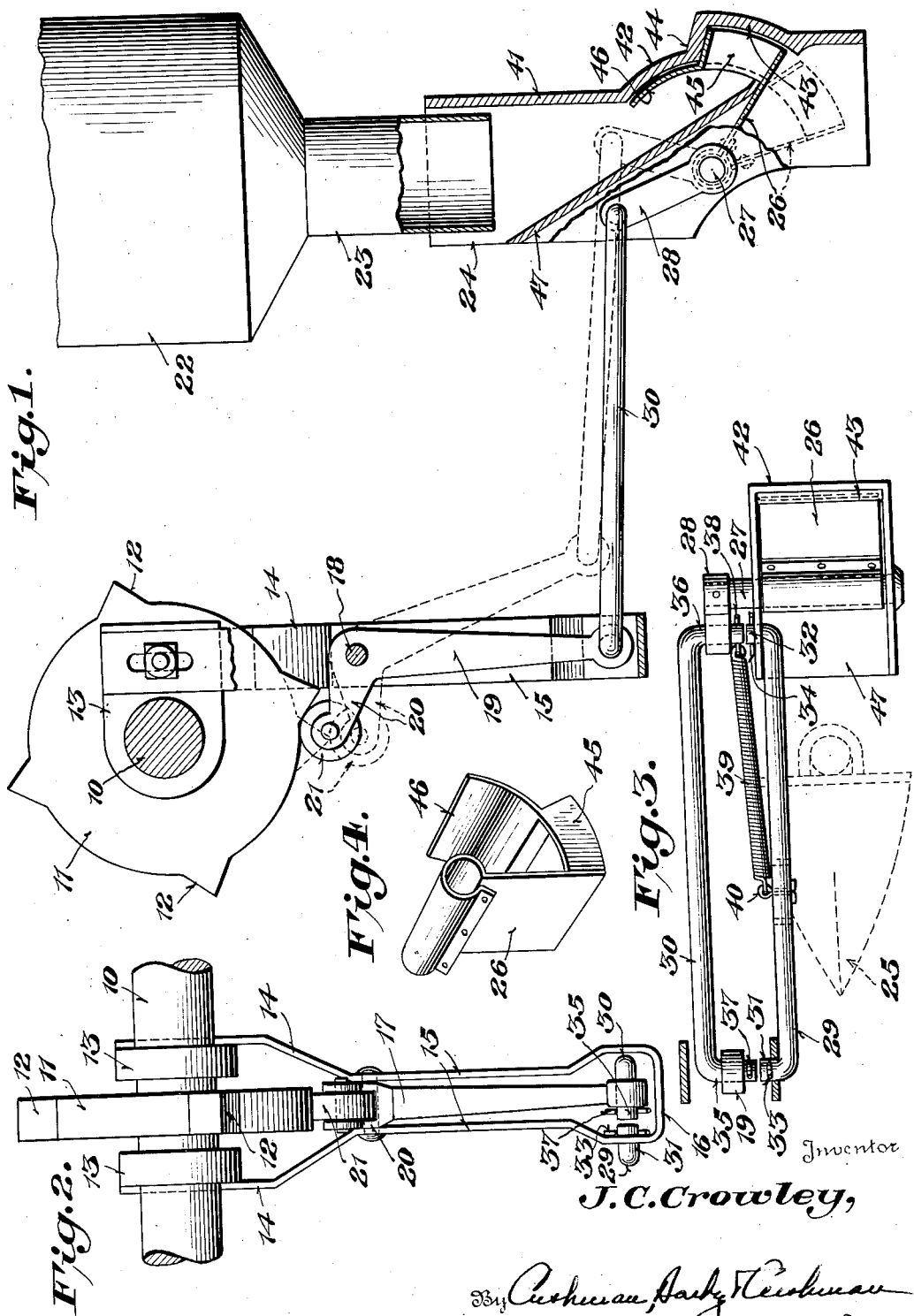

2,054,723

UNITED STATES PATENT OFFICE 2,054,723

SEED DROPPING ATTACHMENT FOR PLANTERS

Jesse C. Crowley, Paris, Tex.

Application May 4, 1935, Serial No. 19,893

12 Claims. (Cl. 111—34)

This invention relates to seed dropping attachments for cotton planters and refers particularly to that type wherein the seed reservoir and spout are fixed with respect to the frame of the planter while the valve casing and valve are carried by the furrow plow and movable therewith relative to the seed spout and the rest of the planter.

In a construction of this nature the valve operating mechanism must compensate for such movement of the valve and valve casing without interfering with the operation thereof, and it is therefore the primary object of the present invention to provide valve actuating means which will function efficiently during all movements of the valve casing.

Another object is the provision of a valve structure which operates to discharge a predetermined amount of seeds at spaced intervals without permitting any of the seeds to escape from the spouts during the intervals between the discharging operations.

With the foregoing and other objects in view, the invention will now be more particularly described, reference being had to the accompanying drawing wherein:—

Figure 1 is a side elevation partly in section of the seed dropping apparatus;

Figure 2 is an end view of the valve actuating means;

Figure 3 is a bottom view of the valve casing and the linkage mechanism; and

Figure 4 is a perspective view of the valve.

Referring now to the drawing, and particularly to Figure 1, the numeral 10 designates a rotary shaft or axle of a cotton seed planter upon which is fixedly mounted a cam wheel 11 provided with a plurality of spaced cams 12 about its periphery. Suitably secured to one or more fixed parts of the planter, such as the axle bearings 13, is a lever support 14. This support is substantially U-shaped in formation, having spaced sides 15 connected by a bottom cross piece 16. A valve actuating lever 17 is pivotally mounted upon a stud 18 which is secured between the sides 15 intermediate the ends thereof. This lever is in the form of a bell crank lever having a downwardly projecting arm 19 normally housed between the sides 15 and an upper arm 20 projecting laterally from the support and constituting a bearing for a roller 21 which is positioned within the path of the cams 12 and adapted to be moved thereby to the dotted line position.

Spaced from the support 14 and fixed with relation to said support upon the planter frame is a seed reservoir or can 22 provided with a downwardly projecting spout 23. A valve casing 24 is positioned below the reservoir 22 and in overlapping or telescoping relation to the spout 23. This casing is preferably mounted upon the seed furrow plow 25 of the planter in any suitable manner and is movable upwardly and downwardly with the plow as the planter travels over the ground. A valve 26 is housed within the casing 24 and is supported upon a shaft 27 which is pivotally mounted in opposite walls of the valve casing. A crank arm 28 is fixed to the shaft 27 and projects upwardly to a point substantially in alignment with the lower extremity of the lever arm 19.

In view of the fact that the valve and valve casing move in an up and down direction with respect to the spout 22 and support 14, it is necessary to provide connections between the valve casing and support and also the valve and valve actuating lever which will permit such movement of the valve casing and at the same time provide an efficient actuating connection. In the present invention this is accomplished by the provision of a pair of connecting links 29 and 30. The link 20 connects the valve casing with the lower portion of the support 14 as shown in Figure 3. Each end of the link is bent at right angles to the rest of the link to provide stubs 31 and 32 respectively. Stub 31 projects through an opening in one of the walls 15 of the support and is prevented from detachment therefrom by means of a cotter pin 33. In a similar manner the stub 32 projects through an opening in the valve casing 24 and is secured in place by a cotter pin 34. The link 30 is substantially identical with the link 29, being of the same length and also provided with inturned end portions 35 and 36 aligning with the stubs 33 and 32 respectively in the closed position of the valve. The end portion 35 is pivotally connected to the lower extremity of the lever arm 19 and is retained in position by a cotter pin 37. The other end portion 36 is pivotally connected to the upper end of the crank arm 28 and is retained in place by the cotter pin 38. In order that the valve may be normally retained in its closed position, there is provided a coil spring 39 having one end secured intermediate of the ends of the link 29 by a cotter pin 40 and its other end secured to the stub 36 of the link 30 by the pin 38 which retains that end of the link in operative connection with the crank arm 28.

With the construction as thus far described and assuming that the planter is in motion, the rotation of the shaft 10 and cam wheel 11 will function to intermittently move the lever 17 about its pivot to the dotted line position shown in Figure 1. This movement will impart motion to the link 30 which in turn will move the valve from closed to open position against the tension of the spring 39, this spring forcing the valve to closed position after the particular cam 12 has moved over the roller 21. By reason of the fact that the links 30 and 31 are normally maintained in parallel relation, they will naturally move in unison about their pivots during the up and down motion of the valve casing 24 and thus always function to permit an efficient operation of the valve. It will also be observed that the spring 39 is positioned substantially parallel with the links 29 and 30 and will move in this relation to said links during the up and down movement of the valve casing. Thus, the tension exerted upon the valve by the spring is always constant regardless of the position of the valve casing with respect to the spout 23 and the support 14.

Referring now to Figure 1, the valve casing is provided with a wall 41 having offset arcuate concentric sections 42 and 43 respectively, and a connecting portion 44. The valve 26 is suitably secured to the shaft 27 and is provided with a substantially box-shaped body 45 having its outer portion curved to fit the section 43. The valve body 45 has a portion thereof extended upwardly to form a curved plate 46 which is adapted to lie substantially flush with the arcuate section 42 in the closed position of the valve. In the retracted position of the valve, the section 43 constitutes a closure for the valve body while the portion 44 functions as a stop to limit the closing movement of the valve. The valve casing is provided with an inclined wall 47 located opposite to the wall 41 and whose lower end is spaced from the arcuate section 43 a distance substantially equal to the length of the valve box. This lower extremity of the wall 47 is also spaced from the stop 44 a distance less than the length of the curved plate 46.

With this construction of valve and casing and by reason of the shaft 27 being the common center of the arcuate sections 42 and 43, the operation of the valve actuating means will move the valve body from the full line to the dotted line position, this movement kicking out a predetermined number of seeds which have collected in the box-like body. As the valve moves about its pivot, the plate 46 will slide downwardly and close the discharge opening between the walls 41 and 47 and thus permit only the seeds contained in the valve body to be discharged upon the ground. The spring 39 will return the valve to its closed position with the portion 44 limiting the return movement of the valve and with the plate 46 again lying flush with the section 42 where it will not obstruct the flow of seeds to the valve body 45. This operation is intermittently repeated each time one of the cams 12 engages the roller 21 and operates the valve operating mechanism.

With the above construction, it will be apparent that I have provided a seed dropping attachment for planters which will function efficiently regardless of the movement of the valve casing and valve with respect to the seed spout. Furthermore, the valve and casing are so constructed that the valve will force or kick the seeds out into the furrows and will automatically shut off the flow of seeds from the spout and prevent straggling of the seeds between the hills or points of discharge.

While my seed dropping attachment is adapted particularly for use in planting cotton seeds, I do not limit the invention to such use as it is capable of controlling the planting of various types of seeds. Furthermore, it may be applied to any type of planter regardless of its construction or use, although it is best adapted for use where a furrow or other plow is movable relatively to the rest of the planter.

I claim:—

1. In a planter, a seed spout, a valve casing communicating with said spout and movable upwardly and downwardly with relation to the same, a seed dropping valve mounted in said valve casing, a support fixed with relation to the seed spout, a link pivotally connected to the support and valve casing to maintain the same in fixed spaced relation and permitting up and down movement of the valve casing, a valve actuating lever mounted on said support, a second link pivotally connected to the lever and valve and normally maintained in parallel relation with respect to said first mentioned link to permit unitary movement of said links about their pivots during up and down movement of the valve casing, and means for operating the valve actuating lever.

2. In a planter, a seed spout, a valve casing communicating with said spout and movable upwardly and downwardly with relation to the same, a seed dropping valve mounted in said valve casing, a support fixed with relation to the seed spout, a link having its ends bent inwardly and pivotally connected to the support and valve casing respectively to maintain the same in fixed spaced relation and permitting up and down movement of the valve casing, a valve actuating lever mounted on said support, a second link of substantially the same length as the first mentioned link and having its ends bent inwardly and pivotally connected to the lever and valve respectively and normally maintained in parallel relation with respect to said first mentioned link to permit unitary movement of said links about their pivots during up and down movement of the valve casing, and means for operating the valve actuating lever.

3. In a planter, a seed spout, a valve casing communicating with said spout and movable upwardly and downwardly with relation to the same, a seed dropping valve mounted in said valve casing, a support fixed with relation to the seed spout, a link connecting the valve casing with the support and maintaining the same in fixed spaced relation and permitting up and down movement of the valve casing, a valve actuating lever mounted on said support, a second link connecting the lever with the valve, means for normally retaining the valve in closed position including a spring connected to said links, and means for operating the valve actuating lever.

4. In a planter, a seed spout, a valve casing communicating with said spout and movable upwardly and downwardly with relation to the same, a seed dropping valve mounted in said valve casing, a support fixed with relation to the seed spout, a link connecting the valve casing with the support and maintaining the same in fixed spaced relation and permitting up and down movement of the valve casing, a valve actuating lever mounted on said support, a second link connecting the lever with the valve, a spring having one end thereof secured to one link and its other end secured to the other link and normally retaining the valve in closed position, and means for operating the valve actuating lever.

5. In a planter, a seed spout, a valve casing communicating with said spout and movable upwardly and downwardly with relation to the same, a seed dropping valve mounted in said valve casing, a support fixed with relation to the seed spout, a link connecting the valve casing with the support and maintaining the same in fixed spaced relation and permitting up and down movement of the valve casing, a valve actuating lever mounted on said support, a second link connecting the lever with the valve and normally maintained in parallel relation with respect to said first mentioned link to permit unitary movement of said links with respect to said support and valve casing during up and down movement of the latter, a spring having its ends secured to said links and extending longitudinally thereof in substantially the same plane and normally retaining the valve in closed position, and means for operating the valve actuating lever.

6. In a planter, a seed spout, a valve casing communicating with said spout and movable upwardly and downwardly with relation to the same, a seed dropping valve mounted in said valve casing, a support fixed with relation to the seed spout, a link connecting the valve casing with the support and maintaining the same in fixed spaced relation and permitting up and down movement of the valve casing, a valve actuating lever mounted on said support, a second link connecting the lever with the valve and normally maintained in parallel relation with respect to said first mentioned link to permit unitary movement of said links with respect to said support and valve casing during up and down movement of the latter, a spring having one end thereof secured to said first mentioned link intermediate the ends of said link and having its other end secured to an end of the second mentioned link and extending longitudinally thereof in substantially the same plane and normally retaining the valve in closed position, and means for operating the valve actuating lever.

7. In a seed dropping attachment for a planter, a valve casing having a wall provided with an arcuate section constituting a valve closure and an inwardly projecting portion constituting a stop for limiting the movement of the valve in one direction, a valve mounted in said casing and having a tubular shaped body curved to fit said arcuate section of the wall, said valve body being adapted to be carried away from said arcuate sections to discharge position, and means carried by said valve and movable to a position to close the casing outlet when the valve body is carried to its discharge position.

8. In a seed dropping attachment for a planter, a valve casing having a wall provided with offset arcuate concentric sections and a connecting portion constituting a stop for limiting the movement of a valve in one direction, a valve mounted in said casing and having a box shaped body curved to fit one of said arcuate sections and said section forming a closure for the valve in one position, said valve body being adapted to be carried away from said sections to discharge position, and a curved plate secured to said valve body and associated with the other arcuate sections of the valve casing and movable to a position for closing the casing outlet when the valve body is moved to its discharge position.

9. In a seed dropping attachment for a planter, a valve casing having a wall provided with offset arcuate concentric sections and a connecting portion constituting a stop for limiting the movement of a valve in one direction, a valve pivotally mounted in said casing with its pivot point being the center of the arcuate sections, said valve having a box shaped body curved to fit one of said arcuate sections and said section forming a closure for the valve in one position, said valve body being adapted to be carried away from said section to discharge position, and a curved plate secured to said valve body and lying flush with said second arcuate section in closed position of the valve, said plate being movable to a position for closing the casing outlet when the valve body is moved to its discharge position.

10. In a seed dropping attachment for a planter, a valve casing having a wall provided with offset arcuate concentric sections and a connecting portion constituting a stop for limiting the movement of a valve in one direction, a valve mounted in said casing and having a box shaped body curved to fit one of said arcuate sections and said section forming a closure for the valve in one position, said valve body being adapted to be carried away from said sections to discharge position, and a curved plate secured to said valve body and associated with the other arcuate section of the valve casing, the lower end of the opposite wall of the casing being spaced from the first mentioned arcuate wall section a distance equal to the length of the valve body and being spaced from the second arcuate wall section less than the length of the curved plate whereby when the valve body is moved to discharge position the plate will close the casing outlet.

11. In a planter, a seed spout, a valve casing communicating with said spout and movable upwardly and downwardly with relation to the same, a seed dropping valve mounted in said valve casing, a support fixed with relation to the seed spout, a link pivotally connected to the support and valve casing to maintain the same in fixed spaced relation and permitting up and down movement of the valve casing, a valve actuating lever mounted on said support, a second link pivotally connected to the lever and valve, the pivot points of adjacent ends of said links being normally axially aligned to permit unitary movement of said links about their pivots during up and down movement of the valve casing, and means for operating the valve actuating lever.

12. In a planter, a seed spout, a valve casing communicating with said spout and movable upwardly and downwardly with relation to the same, a seed dropping valve mounted in said valve casing, a support fixed with relation to the seed spout, a link connecting the valve casing with the support and maintaining the same in fixed spaced relation and permitting up and down movement of the valve casing, a valve actuating lever mounted on said support, a second link connecting the lever with the valve and normally maintained in parallel relation with respect to said first mentioned link to permit unitary movement of said links with respect to said support and valve casing during up and down movement of the latter, a spring extending longitudinally of said links in substantially the same plane and having one end thereof connected to said second link to normally retain the valve in closed position, and means for operating the valve actuating lever.

JESSE C. CROWLEY.